(12) United States Patent
Zhang et al.

(10) Patent No.: US 11,522,569 B2
(45) Date of Patent: Dec. 6, 2022

(54) METHOD FOR REDUCING SGLTE COUPLING DE-SENSE AND MOBILE TERMINAL

(71) Applicant: HuiZhou TCL Mobile Communication Co., Ltd., HuiZhou (CN)

(72) Inventors: Sheng Zhang, HuiZhou (CN); Zhihao Zheng, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 17/272,668

(22) PCT Filed: Oct. 29, 2019

(86) PCT No.: PCT/CN2019/114019
§ 371 (c)(1),
(2) Date: Mar. 2, 2021

(87) PCT Pub. No.: WO2020/103652
PCT Pub. Date: May 28, 2020

(65) Prior Publication Data
US 2021/0344369 A1    Nov. 4, 2021

(30) Foreign Application Priority Data
Nov. 21, 2018 (CN) .......................... 201811389422.7

(51) Int. Cl.
*H04B 1/10* (2006.01)
*H04B 1/12* (2006.01)

(52) U.S. Cl.
CPC ........... *H04B 1/1036* (2013.01); *H04B 1/109* (2013.01); *H04B 1/1018* (2013.01); *H04B 1/12* (2013.01)

(58) Field of Classification Search
CPC .... H04B 1/1036; H04B 1/1018; H04B 1/109; H04B 1/12; H04B 1/1009
See application file for complete search history.

(56) References Cited

U.S. PATENT DOCUMENTS

| 5,812,590 A | * | 9/1998 | Black | H04B 15/04 331/25 |
| 6,363,262 B1 | * | 3/2002 | McNicol | H04B 1/26 455/313 |

(Continued)

FOREIGN PATENT DOCUMENTS

| CA | 2198337 C | * | 6/2000 | ............... H04B 1/69 |
| CN | 101667853 A | * | 3/2010 | ............... H03F 1/02 |

(Continued)

OTHER PUBLICATIONS

CN 104518836 (PE2E—Search Translated).*

(Continued)

*Primary Examiner* — Berhanu Tadese

(57) ABSTRACT

Disclosed in the present application are a method for reducing SGLTE coupling de-sense and a mobile terminal, the method including: filtering out an LTE network frequency band in a signal transmitted by a signal transmission end of a GSM; and filtering out a network frequency band in a signal of a signal reception end accessing the GSM other than a GSM network frequency band. Employing the present application may eliminate mutual interference between a GSM signal and an LTE signal due to the GSM network frequency band and the LTE network frequency band getting too close to each other, which greatly alleviates SGLTE mobile terminal coupling de-sense situation.

11 Claims, 1 Drawing Sheet

(56) References Cited

U.S. PATENT DOCUMENTS

| | | | | |
|---|---|---|---|---|
| 6,694,129 | B2 * | 2/2004 | Peterzell | H04B 1/109 455/208 |
| 7,916,090 | B2 * | 3/2011 | Nysen | H01Q 5/364 343/702 |
| 7,965,134 | B2 * | 6/2011 | Aparin | H04B 1/123 327/551 |
| 8,320,866 | B2 * | 11/2012 | Pratt | H04B 1/525 455/295 |
| 8,320,868 | B2 * | 11/2012 | Pratt | H04B 1/525 455/296 |
| 8,396,427 | B2 * | 3/2013 | Le Guillou | H04B 1/1036 455/306 |
| 8,767,869 | B2 * | 7/2014 | Rimini | H04B 1/30 375/267 |
| 8,830,934 | B2 * | 9/2014 | Banister | H04B 1/0475 370/329 |
| 8,831,655 | B2 * | 9/2014 | Burchill | H04L 1/20 370/338 |
| 8,995,553 | B2 * | 3/2015 | Chen | H04W 72/1215 375/267 |
| 9,231,630 | B2 * | 1/2016 | Conroy | H04B 1/406 |
| 9,445,275 | B2 * | 9/2016 | Chen | H04B 7/0691 |
| 9,484,974 | B2 * | 11/2016 | Tu | H04B 1/123 |
| 9,525,499 | B2 * | 12/2016 | Jakoby | H04B 15/00 |
| 9,538,580 | B2 * | 1/2017 | Sun | H04B 1/525 |
| 9,749,925 | B2 * | 8/2017 | Chrisikos | H04B 7/18541 |
| 9,780,755 | B1 * | 10/2017 | Omid-Zohoor | H01F 27/29 |
| 9,800,287 | B2 * | 10/2017 | Hwang | H04B 1/525 |
| 9,935,662 | B2 * | 4/2018 | Khlat | H03F 3/24 |
| 9,991,971 | B2 * | 6/2018 | Mofidi | H04B 15/04 |
| 10,708,923 | B2 * | 7/2020 | Kumar | H04W 72/0406 |
| 2002/0123319 | A1 * | 9/2002 | Peterzell | H04B 1/109 455/296 |
| 2004/0207484 | A1 * | 10/2004 | Forrester | H04B 1/406 333/133 |
| 2012/0231751 | A1 * | 9/2012 | Oka | H04B 1/0053 455/78 |
| 2012/0243447 | A1 * | 9/2012 | Weissman | H04B 1/0458 370/280 |
| 2014/0119259 | A1 | 5/2014 | Nilsson et al. | |
| 2014/0274201 | A1 * | 9/2014 | Sun | H04B 1/525 455/552.1 |
| 2015/0381291 | A1 * | 12/2015 | Mahajan | H04B 15/00 370/252 |
| 2016/0050031 | A1 * | 2/2016 | Hwang | H04B 1/525 375/219 |
| 2016/0072543 | A1 * | 3/2016 | Abrishamkar | H04B 1/40 375/219 |
| 2016/0105808 | A1 * | 4/2016 | Song | H04W 52/288 455/422.1 |
| 2017/0063427 | A1 * | 3/2017 | Lee | H04B 1/525 |
| 2018/0131397 | A1 * | 5/2018 | Emadi | H04B 1/525 |
| 2018/0234101 | A1 * | 8/2018 | Lu | H03M 3/42 |
| 2020/0314867 | A1 * | 10/2020 | Kumar | H04W 72/082 |
| 2021/0136696 | A1 * | 5/2021 | Burke | H04W 52/146 |
| 2021/0273673 | A1 * | 9/2021 | Hanaoka | H04B 1/525 |
| 2021/0344369 | A1 * | 11/2021 | Zhang | H04B 1/1018 |

FOREIGN PATENT DOCUMENTS

| | | | | | |
|---|---|---|---|---|---|
| CN | 102187586 | A | * | 9/2011 | H04B 1/1036 |
| CN | 101631161 | B | * | 5/2012 | H01Q 1/243 |
| CN | 102545945 | A | * | 7/2012 | H01Q 1/243 |
| CN | 102763338 | A | * | 10/2012 | H04B 1/525 |
| CN | 102780994 | | | 11/2012 | |
| CN | 101667853 | B | * | 10/2013 | H03F 1/02 |
| CN | 103595438 | | | 2/2014 | |
| CN | 102545945 | B | * | 1/2015 | H01Q 1/243 |
| CN | 102187586 | B | * | 2/2015 | H04B 1/1036 |
| CN | 102763338 | B | * | 3/2015 | H04B 1/525 |
| CN | 104427656 | | | 3/2015 | |
| CN | 104518836 | | * | 4/2015 | H04B 15/00 |
| CN | 104518836 | A | * | 4/2015 | |
| CN | 104660297 | A | * | 5/2015 | H04B 1/525 |
| CN | 105827252 | | | 8/2016 | |
| CN | 105827252 | A | * | 8/2016 | H04B 1/0053 |
| CN | 104660297 | B | * | 4/2017 | H04B 1/525 |
| CN | 106688192 | A | * | 5/2017 | H04B 1/0475 |
| CN | 107209271 | A | * | 9/2017 | G01S 19/21 |
| CN | 107820332 | | | 3/2018 | |
| CN | 107820332 | A | * | 3/2018 | H04B 1/10 |
| CN | 207652707 | U | * | 7/2018 | |
| CN | 109274437 | A | * | 1/2019 | G06F 1/08 |
| CN | 109660270 | | | 4/2019 | |
| CN | 107209271 | B | * | 7/2020 | G01S 19/21 |
| CN | 109274437 | B | * | 11/2021 | G06F 1/08 |
| EP | 3038273 | A1 | * | 6/2016 | H04B 15/00 |
| EP | 2471185 | B1 | * | 4/2017 | H04B 1/525 |
| EP | 1350332 | B1 | * | 11/2017 | H03D 3/008 |
| EP | 2471186 | B1 | * | 3/2018 | H04B 1/52 |
| EP | 2427968 | B1 | * | 4/2018 | H04B 1/1027 |
| EP | 2311216 | B1 | * | 10/2020 | H04B 15/00 |
| EP | 3254139 | B1 | * | 3/2021 | G01S 19/21 |
| GB | 2311444 | A | * | 9/1997 | H04B 1/69 |
| GB | 2332822 | A | * | 6/1999 | H04B 1/0003 |
| IL | 156857 | A | * | 4/2010 | H03D 3/008 |
| JP | 4105549 | B2 | * | 6/2008 | H03D 3/008 |
| JP | 5654560 | B2 | * | 1/2015 | H03F 1/34 |
| JP | 2015065685 | A | * | 4/2015 | H03F 1/34 |
| JP | 5755638 | B2 | * | 7/2015 | H04B 1/1027 |
| JP | 5908568 | B2 | * | 4/2016 | H03F 1/34 |
| KR | 20160092745 | | * | 8/2016 | H04B 15/00 |
| WO | WO-02056490 | A2 | * | 7/2002 | H03D 3/008 |
| WO | WO-2009030043 | A1 | * | 3/2009 | H01Q 1/2275 |
| WO | WO-2010014649 | A2 | * | 2/2010 | H04B 15/00 |
| WO | WO-2010046798 | A1 | * | 4/2010 | H04B 1/1036 |
| WO | WO-2010111542 | A1 | * | 9/2010 | H03F 1/34 |
| WO | WO-2010129584 | A1 | * | 11/2010 | H04B 1/1027 |
| WO | WO-2011097847 | A1 | * | 8/2011 | H04B 1/525 |
| WO | WO-2011097848 | A1 | * | 8/2011 | H04B 1/52 |
| WO | WO-2012129238 | A2 | * | 9/2012 | H04B 1/0057 |
| WO | WO-2013026038 | A1 | * | 2/2013 | H04B 1/109 |
| WO | WO-2013184971 | A1 | * | 12/2013 | H04B 15/00 |
| WO | WO-2014159742 | A2 | * | 10/2014 | H04B 1/3827 |
| WO | WO-2015035073 | A1 | * | 3/2015 | H04B 1/1027 |
| WO | WO-2015199826 | A1 | * | 12/2015 | H04B 15/00 |
| WO | WO-2016040583 | A1 | * | 3/2016 | H04B 1/123 |
| WO | WO-2016040590 | A1 | * | 3/2016 | H04B 1/40 |
| WO | WO-2016057183 | A1 | * | 4/2016 | H04B 15/00 |
| WO | WO-2016126393 | A1 | * | 8/2016 | G01S 19/21 |
| WO | WO-2016191088 | A1 | * | 12/2016 | H04B 1/525 |
| WO | WO-2017034826 | A1 | * | 3/2017 | H04B 1/126 |
| WO | WO-2018084993 | A1 | * | 5/2018 | H04B 1/1036 |
| WO | WO-2018151886 | A1 | * | 8/2018 | H03M 1/0617 |
| WO | WO-2020129882 | A1 | * | 6/2020 | H04B 1/006 |
| WO | WO-2021087488 | A1 | * | 5/2021 | H04B 1/123 |

OTHER PUBLICATIONS

KR20160092745, (PE2E Search Translated).*
CN 105827252, (Machine Translated).*
TS 136 101—V14.3.0—LTE; Evolved Universal Terrestrial Radio Access (E-UTRA); User Equipment (UE) radio transmission and reception (3GPP TS 36.101 version 14.3.0 Release 14, Apr. 2017) (Year: 2017).*
Yang Si-Yuan, Technology of LTE, Dual streams beamforming, SGLTE (simultaneous GSM and LTE), Dual standby strategy (LTE and GSM synchronization), CAICT, indexed by Google Feb. 2015, Source: https://docplayer.net/50768585-Technology-of-4g-lte-siyuan-yang-caict.html (Year: 2015).*
KR20150082842, (Machine Translated using PE2E—Search Tool).*
CN 104518836 (Machine Translated using PE2E—Search Tool).*
CN 104518836, (Chinese Language Publication).*
KR20150082842, (Korean Language Publication).*

* cited by examiner

METHOD FOR REDUCING SGLTE COUPLING DE-SENSE AND MOBILE TERMINAL

CROSS REFERENCE TO RELATED APPLICATIONS

This application is a National Phase of PCT Patent Application No. PCT/CN2019/114019 having International filing date of Oct. 29, 2019, which claims the benefit of priority of Chinese Patent Application No. 201811389422.7 filed on Nov. 21, 2018. The contents of the above applications are all incorporated by reference as if fully set forth herein in their entirety.

FIELD AND BACKGROUND OF THE INVENTION

The present application relates to the technical field of mobile terminal communications, and in particular, to a method and mobile terminal for reducing simultaneous GSM and LTE (SGLTE) coupling de-sense.

A so-called sensitivity degradation (de-sense) refers to a phenomenon that an introduction of external or main body interference sources in a weak signal situation of a mobile terminal leads to a decrease in audio quality or a high data error rate, or even a call drops or break up. There are many reasons for coupling de-sense, such as interference of peripheral devices such as camera, SIM card, LCM, TP, etc., interference of the device itself, such as transmission interference of a duplexer and a quadruplexes, or the interference of Band 7 & 40 and WIFI & BT spectrum resources. The interference of peripheral devices is mainly caused by MIPI data and dock. The interference of the device itself is mainly caused by poor isolation of the device. The interference of spectrum resources is mutual interference of spectrum resources in a case where two working modes of the device coexist.

SGLTE is presented to consumers as a novel mobile phone working mode. SGLTE requires mobile phones to work in both GSM and LTE modes. The former provides voice communication and the latter provides data communication, which means that you can talk and surf the Internet at the same time. Such feature requires the mobile phone to support two sets of chips, one set is a 4G chip, and the other set is a 2G chip, rendering larger power consumption in comparison to conventional modes. A significant issue is raised when designing an SGLTE solution in which the GSM and TDS/TDD LTE bands coexist. In the combination of EGSM+TD dual talk, the distance between EGSM and TDD bands is relatively large. The EGSM transmission path incorporated with a low pass filter (LPF) is sufficient to attenuate the EGSM portion that overlaps the TDD band. Another particularly concerned example is the coexistence of DCS 1800 and TDS 39/TDD LTE B39. The transmission and reception frequencies of DCS1800 are 1710-1785 Mhz and 1805-1880 Mhz, respectively, and the frequency range of TDS/TDD LTE B39 is 1880-1920 Mhz. The transmission frequency of GSM is close to the reception frequency of B39, so that a part of the block energy is overlapped with B39; and the transmission frequency range of B39 and the reception frequency range of DCS1800 are close to each other, which will have an impact on DCS. If the separation between the DCS and B39 antennas is not large enough, severe coupling sensitivity degradation could be induced.

It is therefore desirable to develop an improved solution to attend to the described issue.

SUMMARY OF THE INVENTION

Embodiments of the present application provide a method and a mobile terminal for reducing the SGLTE coupling de-sense, and are intended to solve the problem of severe SGLTE coupling de-sense in the SGLTE mobile terminal in the prior art.

In a first aspect, an embodiment of the present application provides a method for reducing SGLTE coupling de-sense, including the steps of: filtering out an LTE frequency band in a signal to be transmitted in a GSM signal transmission end, and filtering out all frequency bands other than a GSM frequency band in a received signal on a GSM signal reception end.

In an embodiment of SGLTE coupling de-sense reduction, the step of filtering out the LTE frequency band in the signal to be transmitted on the GSM signal transmission end comprises: keeping a GSM transmission loss below 1 dB.

In an embodiment of SGLTE coupling de-sense reduction, a band stop filter is provided in the GSM transmission path to filter out the LTE frequency band in the signal to be transmitted on the GSM signal transmission end.

In an embodiment of SGLTE coupling de-sense reduction, the band stop filter passes a frequency band of 1710-1785 Mhz and blocks a frequency band of 1880-1920 Mhz.

In an embodiment of SGLTE coupling de-sense reduction, the band stop filter attenuates the frequency band of 1880-1920 MHz by at least 20 dB In an embodiment of SGLTE coupling de-sense reduction, the band stop filter is provided between a GSM power amplifier and a GSM path switch.

In an embodiment of SGLTE coupling de-sense reduction, the band stop filter is composed of a piezoelectric crystal oscillator material.

In an embodiment of SGLTE coupling de-sense reduction, the band stop filter is composed of a piezoelectric crystal oscillator material.

In the method of reducing the SGLTE coupling de-sense, the band stop filter is made of piezoelectric ceramics, lithium niobate, and quartz laminated.

In an embodiment of SGLTE coupling de-sense reduction described above, a GSM reception filter is deployed on a GSM reception path to receive the GSM signals.

In an embodiment of SGLTE coupling de-sense reduction, further comprising a step of filtering out all frequency bands other than the LTE frequency band in signals received/transmitted in an LTE path.

In an embodiment of SGLTE coupling de-sense reduction described above, an LTE filter is provided in the LTE path to filter out frequency bands other than the LTE frequency band in signals received/transmitted in the LTE path.

In a second aspect, an embodiment of the present application further provides a mobile terminal capable of SGLTE communications, comprising a band stop filter deployed in a GSM transmission path to filter out an LTE frequency band in a signal to be transmitted in a GSM transmission end, and a GSM reception filter deployed in a reception path to filter out all frequency bands other than a GSM frequency band in a received signal on a GSM signal reception end.

In the mobile terminal described above, an LTE filter is provided in the LTE path to filter out frequency bands other than the LTE frequency band in signals received/transmitted along the LTE path.

In a third aspect, an embodiment of the present application further provides a mobile terminal, comprising a processor and a memory. The processor is adapted to execute instructions, and the memory is adapted to store instructions. The processor loads the instructions from the memory to perform the following steps.

An LTE frequency band in a signal to be transmitted is filtered out in a GSM signal transmission end.

All frequency bands other than a GSM frequency band in a received signal are filtered out on a GSM signal reception end.

When filtering out the LTE frequency band in the signal to be transmitted on the GSM signal transmission end, a GSM transmission loss is kept under 1 dB.

A band stop filter is employed to pass through a frequency band of 1710-1785 Mhz, and block a frequency band of 1880-1920 Mhz; wherein the frequency band of 1880-1920 Mhz is attenuated by at least 20 dB.

The LTE frequency band in the signal to be transmitted is filtered out on the GSM signal transmission end.

In the mobile terminal described above, a GSM reception filter is provided in the GSM reception path to receive GSM signals.

In the mobile terminal, the band stop filter is provided between a GSM power amplifier and a GSM path switch.

In the mobile terminal, the band stop filter is composed of a piezoelectric crystal oscillator material.

In the mobile terminal, the band stop filter is made of piezoelectric ceramic, lithium niobate, and quartz laminated.

In the mobile terminal, the method further includes the steps of: filtering out all frequency bands other than the LTE frequency band in signals received/transmitted in an LTE path.

BRIEF DESCRIPTION OF THE SEVERAL VIEWS OF THE DRAWINGS

The invention can be more fully understood by reading the subsequent detailed description and examples with references made to the accompanying drawings, wherein.

DETAILED DESCRIPTION OF SPECIFIC EMBODIMENTS OF THE INVENTION

The present application provides a method and mobile terminal for reducing the deterioration of SGLTE's overall sensitivity. In order to make the purpose, technical solution, and effects of the present application clearer and clearer, the present application will be described in further detail below. It should be understood that the specific embodiments described herein are only used to explain the present application, and are not used to limit the present application.

Figure 1:
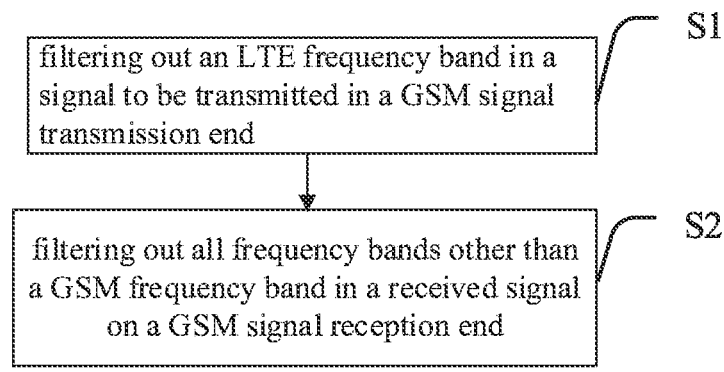
FIG. 1 is a flowchart of a preferred embodiment of a method for reducing SGLTE coupling de-sense according to an embodiment of the present application.

A method for reducing the SGLTE coupling de-sense, as shown in FIG. 1, includes the following steps.

S1, an LTE frequency band in a signal to be transmitted is filtered out on the GSM signal transmission end.

S2, frequency bands other than a GSM frequency band in a received signal are filtered out on the GSM signal reception end.

The application can eliminate interferences of the GSM signal to the LTE signal by filtering out the LTE frequency band in the transmission signal on the GSM signal transmission end. All frequency bands other than the GSM frequency band in the received signal are filtered out on the GSM signal reception end, so that the GSM signal reception end receives only the GSM signal, which isolates the interference of the GSM received signal from that of other frequency bands. The problem of signal interference caused by the frequency band proximity is thereby attenuated, significantly alleviating the SGLTE coupling de-sense.

In an embodiment of SGLTE coupling de-sense reduction, in order to ensure the performance of GSM signal transmission, in step S1, it is necessary to ensure that the GSM transmission loss is as small as possible, and the GSM transmission loss is generally controlled to be less than 1 dB, by careful control of the filtering and signal transmissions.

Specifically, in step S1, a band stop filter may be provided in the GSM transmission path. The band stop filter can specifically filter out the LTE frequency band in the signal to be transmitted on the GSM signal transmission end, without affecting other frequency bands in the signal to be transmitted, so that the interferences caused by the transmission in the GSM transmission path is eliminated on the LTE signal reception end.

In some embodiments, the band stop filter passes a frequency band of 1710-1785 Mhz and blocks a frequency band of 1880-1920 Mhz. The transmission and reception frequency ranges of DCS1800 are 1710-1785 Mhz and 1805-1880 Mhz, respectively, and the frequency range of TDS/TDD LTE B39 is 1880-1920 Mhz. Since the transmission frequency of GSM is close to the reception frequency of B39, some block energy overlaps B39, and even more, the transmission frequency range of B39 and the reception frequency range of DCS1800 are so close to each other that may affect DCS1800. Therefore, the coupling de-sense failure on DCS1800 and B39 may often occur, while other de-sense failures are basically neglectable. The band stop filter is configured to pass through the frequency band of 1710-1750 Mhz and block the frequency band of 1880-1920 Mhz, so that the signals of TDE/TDD LTE B39 frequency band can be surgically filtered out. Wherein, the band stop filter can attenuate the frequency band of 1880-1920 Mhz by at least 20 dB. For the sensitivity problem caused by the DCS1800 transmission end that affects B39, a low-pass filter is incapable of fulfilling the requirement due to its poor out-of-band suppression capability, while a band stop filter can meet the requirements.

Specifically, the band stop filter is deployed between a GSM power amplifier and a GSM path switch, so as to guarantee sufficient transmission power while filtering out the LTE frequency band in the signal to be transmitted on the GSM signal transmission end.

The band stop filter is composed of piezoelectric crystal oscillator material. The band stop filter needs to meet the requirements that the in-band differential loss shall be small on the GSM 1800 emission band whereas the out-of-band suppression on B34/39 shall be high enough. Preferably, the band stop filter is made of piezoelectric ceramic, lithium niobate, and quartz laminated. The working principle of SAW filters is to convert electrical signals into mechanical signals and then into electrical signals. The function of the band stop filter is exactly the opposite of the SAW filter.

In step S2, a GSM reception filter is deployed on the GSM reception path to receive the GSM signal, and the frequency band other than the GSM frequency band are filtered out from the received signal on the GSM signal reception end, thereby eliminating the interferences from other frequency bands to the GSM signal reception on the GSM path.

The front-end transmission module of TDS/TDD LTE B39 only has a low-pass filter and does not meet the requirements of sideband suppression. Therefore, the SAW filter must be used in the transmission path of TDS/TDD LTE B39, whereas a narrowband SAW filter be used in the reception path of DCS1800.

Therefore, in an embodiment of SGLTE coupling de-sense reduction, preferably, the method further includes the steps of: filtering out frequency bands other than the LTE frequency band in the signals received/transmitted in the LTE path.

Specifically, an LTE filter may be provided in the LTE path to filter out frequency bands other than the LTE frequency band from the signal received/transmitted in the LTE path. The LTE filter preferably is a filter for TDS/TDD LTE B39/B34 received signals. The LTE filter is a ceramic filter. Preferably, the LTE filter is provided between an LTE path switch and an antenna.

Based on the above embodiments, the present application also provides a storage medium on which a plurality of instructions is stored, where the instructions are adaptable for being loaded by a processor to execute the method for reducing the SGLTE coupling de-sense as described above.

Persons of ordinary skill in the art may understand that all or part of the steps in the various methods of the above embodiments may be accomplished by a programmable hardware, and the program may be stored in a computer-readable storage medium, the storage medium may include: read only memory (ROM), random access memory (RAM), magnetic disk, or optical disk, etc.

Based on the above embodiment, the present application also provides a mobile terminal capable of SGLTE communications. A band stop filter is deployed in a GSM transmission path to filter out an LTE frequency band in a signal to be transmitted in a GSM transmission end. A GSM reception filter deployed in a reception path to filter out all frequency bands other than a GSM frequency band in a received signal on a GSM signal reception end.

In the mobile terminal described above, an LTE filter is provided in the LTE path to filter out frequency bands other than the LTE frequency band in signals received/transmitted in the LTE path.

The technical details and benefits of the above mobile terminal have been elaborated in the above method and will not be repeated here.

Embodiments of the present application also provide a mobile terminal, including a processor, adapted to implement each instruction; and a memory, adapted to store multiple instructions, the instruction is adapted to be loaded by the processor and execute the following steps.

An LTE frequency band in a signal to be transmitted is filtered out in a GSM signal transmission end.

All frequency bands other than a GSM frequency band in a received signal are filtered out on a GSM signal reception end.

When filtering out the LTE frequency band in the signal to be transmitted on the GSM signal transmission end, a GSM transmission loss is kept under 1 dB. A band stop filter is employed to pass through a frequency band of 1710-1785 Mhz, and block a frequency band of 1880-1920 Mhz.

The frequency band of 1880-1920 Mhz is attenuated by at least 20 dB.

A band stop filter is provided in the GSM transmission path to filter out LTE frequency bands from the signals to be transmitted on the GSM signal transmission end.

Wherein, the band stop filter is deployed between a GSM power amplifier and a GSM path switch.

Wherein, the band stop filter is composed of piezoelectric crystal oscillator material.

Wherein, the band stop filter is made of piezoelectric ceramic, lithium niobate, and quartz laminated.

Among them, the method further includes the steps of: filtering out all frequency bands other than the LTE frequency band in signals received/transmitted in an LTE path.

Figure 2:
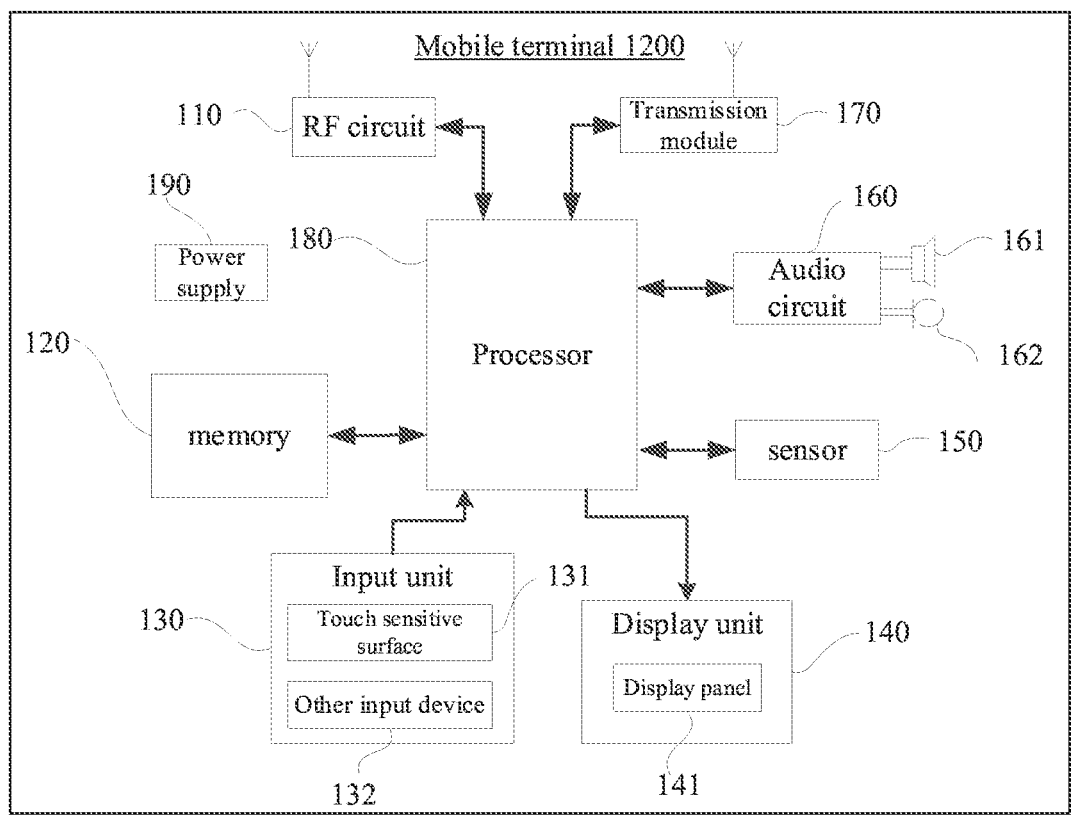
FIG. 2 is a specific structural block diagram of a mobile terminal provided by an embodiment of the present application.

FIG. 2 shows a specific structural block diagram of a mobile terminal provided by an embodiment of the present application. The mobile terminal can be used to implement the method, storage medium, and mobile terminal for reducing the SGLTE coupling de-sense provided in the foregoing embodiment. The mobile terminal 1200 may be a smartphone or a tablet computer.

As shown in FIG. 2, the mobile terminal 1200 may include a radio frequency (RF) circuit 110, a memory 120 including one or more (only one shown in the figure) computer-readable storage media, an input unit 130, a display unit 140, a sensor 150, an audio circuit 160, a transmission module 170, a processor 180 including one or more (only one shown in the figure) processing core, a power supply 190, and other components. Those skilled in the art may understand that the structure of the mobile terminal 1200 shown in FIG. 2 does not constitute a limitation on the mobile terminal 1200, and may include more or fewer components than those illustrated, or a combination of certain components, or different components layout.

Wherein, the RF circuit 110 is used to receive and transmit electromagnetic waves, realizing mutual conversion of electromagnetic waves and electrical signals, and thereby communicate with a communication network or other devices. The RF circuit 110 may include various existing circuit elements for performing these functions, such as an antenna, a radio frequency transceiver, a digital signal processor, an encryption/decryption chip, a subscriber identity module (SIM) card, a memory, and so on. The RF circuit 110 can communicate with various networks such as the Internet, an intranet, a wireless network, or communicate with other devices through the wireless network. The aforementioned wireless network may include a cellular telephone network, a wireless local area network, or a metropolitan area network. The above wireless network can use various communication standards, protocols and technologies, including but not limited to Global System for Mobile Communication (GSM), Enhanced Data GSM Environment (EDGE), broadband codes Wideband Code Division Multiple Access, WCDMA), Code Division Access (CDMA), Time Division Multiple Access (TDMA), wireless fidelity (Wi-Fi) (such as American electrical and electronic engineering Association standards IEEE 802.11a, IEEE 802.11b, IEEE802.11g and/or IEEE 802.11n), Voice over Internet Protocol (VoIP) Worldwide Interoperability for Microwave Access (Wi-Max), other Protocols for mail, instant messaging and short messages, and any other suitable communication protocols, and may even include those that have not yet been developed.

The memory 120 may be used to store software programs and modules, such as the method for reducing the SGLTE coupling de-sense, the storage medium, and the program instructions/modules corresponding to the mobile terminal in the foregoing embodiment. The processor 180 stores the software programs and modules to perform various functional applications and data processing, that is, to realize the function of reducing the deterioration of the SGLTE's over-all sensitivity. The memory 120 may include a high-speed random-access memory, and may also include a non-volatile memory, such as one or more magnetic storage devices, flash memory, or other non-volatile solid-state memory. In some examples, the memory 120 may further include memories remotely provided with respect to the processor 180, and these remote memories may be connected to the mobile terminal 1200 through a network. Examples of the above network include but are not limited to the Internet, intranet, local area network, mobile communication network, and combinations thereof.

The input unit 130 may be used to receive input digital or character information, and generate keyboard, mouse, joystick, optical, or trackball signal inputs related to user settings and function control. Specifically, the input unit 130 may include a touch-sensitive surface 131 and other input devices 132. The touch-sensitive surface 131, also known as a touch screen or touchpad, can collect user's touch operations on or near it (for example, the user uses any suitable objects or accessories such as fingers, stylus, etc. on the touch-sensitive surface 131 or in operation near the touch-sensitive surface 131), and drive the corresponding connection device according to a preset program. Optionally, the touch-sensitive surface 131 may include a touch detection device and a touch controller. Among them, the touch detection device detects the user's touch orientation, and detects the signal brought by the touch operation, and transmits the signal to the touch controller; the touch controller receives touch information from the touch detection device, and converts it into contact coordinates, and then sends to the processor 180, and can receive the command sent by the processor 180 and execute it. In addition, the touch-sensitive surface 131 may be implemented in various types such as resistive, capacitive, infrared, and surface acoustic waves. In addition to the touch-sensitive surface 131, the input unit 130 may also include other input devices 132. Specifically, other input devices 132 may include, but are not limited to, one or more of a physical keyboards, function keys (such as volume control buttons, switch buttons, etc.), trackball, mouse, joystick, and so on.

The display unit 140 may be used to display information input by the user or provided to the user and various graphical user interfaces of the mobile terminal 1 200. These graphical user interfaces may be composed of graphics, text, icons, videos, and any combination thereof. The display unit 140 may include a display panel 141. Alternatively, the display panel 141 may be configured in the form of liquid crystal display (LCD), organic light-emitting diode (OLED), or the like. Further, the touch-sensitive surface 131 may cover the display panel 141, and when the touch-sensitive surface 131 detects a touch operation on or near it, it is transmitted to the processor 180 to determine the type of touch event, and then the processor 180 according to the touch event provides corresponding visual output on the display panel 141. Although in FIG. 2, the touch-sensitive surface 131 and the display panel 141 are implemented as two independent components to realize the input and output functions, in some embodiments, the touch-sensitive surface 131 and the display panel 141 may be integrated to realize the input and output functions. The display interface of the mobile terminal in the above embodiment may be represented by the display unit 140, and the content associated with the current mobile payment information and the current store information may be displayed on the display unit 140 of the mobile terminal 1200, that is, the displayed content of the display interface can be displayed by the display unit 140.

The mobile terminal 1200 may further include at least one sensor 150, such as a light sensor, a motion sensor, and other sensors. Specifically, the light sensor may include an ambient light sensor and a proximity sensor, wherein the ambient light sensor may adjust the brightness of the display panel 141 according to the brightness of the ambient light, and the proximity sensor may close the display panel 141 and/or backlight when the mobile terminal 1200 moves to the ear. As a type of motion sensor, the gravity acceleration sensor can detect the magnitude of acceleration in various directions (generally three axes), and can detect the magnitude and direction of gravity when at rest, and can be used to identify mobile phone gesture applications (such as horizontal and vertical screen switching, related games, magnetometer posture calibration), vibration recognition related functions (such as pedometer, tap), etc. As for the mobile terminal 1200, other sensors such as gyroscope, barometer, hygrometer, thermometer, infrared sensor, etc. can be configured, and relevant description shall not be repeated.

The audio circuit 160, the speaker 161, and the microphone 162 may provide an audio interface between the user and the mobile terminal 1200. The audio circuit 160 may transmit the received electrical signals into electrical signals after conversion to the speaker 161, which converts the speakers 161 into sound signals for output; on the other hand, the microphone 162 converts the collected sound signals into electrical signals, which, after being received by the audio circuit 160, is converted into audio data, and then processed by the audio data output processor 180, and then sent to, for example, another terminal through the RF circuit 110, or the audio data is output to the memory 120 for further processing. The audio circuit 160 may also include an earplug jack to provide communication between peripheral headphones and the mobile terminal 1200.

The mobile terminal 1200 can help users send and receive emails, browse web pages, and access streaming media through the transmission module 170 (such as a Wi-Fi module), which provides users with wireless broadband Internet access. Although FIG. 2 shows the transmission module 170, it can be understood that it is not a necessary component of the mobile terminal 1200, and can be omitted as needed without changing the scope of the essence of the invention.

The processor 180 is the control center of the mobile terminal 1200, and uses various interfaces and lines to connect various parts of the entire mobile phone, by running or executing software programs and/or modules stored in the memory 120, and calling data stored in the memory 120 to execute various functions and process data of the mobile terminal 1200, thereby performing overall monitoring on the mobile phone. Optionally, the processor 180 may include one or more processing cores; in some embodiments, the processor 180 may integrate an application processor and a modem processor, wherein the application processor mainly processes an operating system, a user interface, and applications, etc., and the modem processor mainly processes wireless communication. It is understandable that the modem processor may not be integrated into the processor 180.

The mobile terminal 1200 further includes a power supply 190 (such as a battery) that supplies power to various components. In some embodiments, the power supply may be logically connected to the processor 180 through a power management system, so as to manage charging, discharging, and functions such as power management. The power supply 190 may also include any component such as one or more DC or AC power supplies, recharging systems, power failure detection circuits, power converters or inverters, and power status indicators.

Although not shown, the mobile terminal 1200 may further include a camera (such as a front camera and a rear camera), Bluetooth module, etc., which will not be repeated here. Specifically, in this embodiment, the display unit of the mobile terminal is a touch screen display, the mobile terminal further includes a memory, and one or more programs, wherein one or more programs are stored in the memory, and are configured to be executed by the one or more processors, including instructions for performing the following operations.

An LTE frequency band in a signal to be transmitted is filtered out in a GSM signal transmission end.

All frequency bands other than a GSM frequency band in a received signal are filtered out on a GSM signal reception end.

Wherein, the processor 180 is configured to perform the step of filtering out the LTE frequency band in the signal to be transmitted on the GSM signal transmission end. The following steps are executed.

The GSM transmission loss is kept under 1 dB by careful control of the filtering and transmissions.

Wherein, the processor 180 is configured to execute signal filtering by a band stop filter deployed in the GSM transmission path to filter out the LTE frequency band in the signal to be transmitted on the transmission end.

The band stop filter passes a frequency band of 1710-1785 Mhz and blocks a frequency band of 1880-1920 Mhz.

Wherein, the band stop filter attenuates the 1880-1920 Mhz frequency band by at least 20 dB.

Wherein, the band stop filter is provided between the GSM power amplifier and the GSM path switch.

Wherein, the band stop filter is composed of piezoelectric crystal oscillator material.

Wherein, the band stop filter is made of piezoelectric ceramic, lithium niobate, and quartz laminated.

Wherein, a GSM reception filter is set in the GSM reception path to receive the GSM signal.

Among them, the processor 180 is further configured to perform filtering of frequency bands other than the LTE frequency band in signals received/transmitted in the LTE path.

Wherein, an LTE filter is provided in the LTE path to filter out frequency bands other than the LTE frequency band in signals received/transmitted in the LTE path.

In summary, in the method and mobile terminal for reducing the SGLTE coupling de-sense provided in this application, by filtering out the LTE frequency band in the signal to be transmitted on the GSM signal transmission end, filtering out all frequency bands other than the GSM frequency bands from the received signal on the GSM signal reception end, and filtering out all frequency bands other than the LTE frequency bands in the signals received/transmitted in the LTE path, mutual interference between the GSM signal and the LTE signal induced by close or overlapped frequency bands can be relieved, thereby reducing the coupling de-sense problem of an SGLTE mobile terminal.

It should be understood that the application of the present application is not limited to the above examples, for those of ordinary skill in the art, can be improved or transformed according to the above description, all these improvements and transformations should belong to the claims appended to this application protected range.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing simultaneous Global System for Mobile Communications (GSM) and Long Term Evolution (LTE) (SGLTE) coupling de-sense, comprising:
   filtering out an LTE frequency band in a signal to be transmitted in a GSM signal transmission end;
   filtering out all frequency bands other than a GSM frequency band in a received signal on a GSM signal reception end,
   wherein the step of filtering out the LTE frequency band in the signal to be transmitted on the GSM signal transmission end comprises:
   setting a band stop filter in a GSM transmission path to filter out the LTE frequency band in the signal to be transmitted on the GSM signal transmission end,
   wherein the step of setting the band stop filter comprises: deploying the band stop filter between a GSM power amplifier and a GSM path switch,
   wherein the band stop filter is composed of a piezoelectric crystal oscillator material,
   wherein the band stop filter is made of piezoelectric ceramic, lithium niobate and quartz laminated.

2. The method for reducing the SGLTE coupling de-sense according to claim 1, wherein the step of filtering out the LTE frequency band in the signal to be transmitted on the GSM signal transmission end comprises:
   keeping a GSM transmission loss below 1 dB.

3. The method for reducing the SGLTE coupling de-sense according to claim 1, wherein the band stop filter passes a frequency band of 1710-1785 Mhz and blocks a frequency band of 1880-1920 Mhz.

4. The method for reducing SGLTE coupling de-sense according to claim 1, further comprising:
   setting a GSM reception filter on a GSM reception path to receive the GSM signals.

5. The method for reducing the SGLTE coupling de-sense according to claim 1, further comprising:
   filtering out all frequency bands other than the LTE frequency band in signals received/transmitted in an LTE path.

6. The method for reducing the SGLTE coupling de-sense according to claim 5, wherein the step of filtering out all frequency bands other than the LTE frequency band in signals received/transmitted in the LTE path comprises:
   deploying an LTE filter in the LTE path to filter out all frequency bands other than the LTE frequency band in signals received/transmitted in the LTE path.

7. A mobile terminal capable of simultaneous Global System for Mobile Communications (GSM) and Long Term Evolution (LTE) (SGLTE) communications, comprising:
   a GSM signal transmission end coupled to a GSM transmission path for transmitting GSM signals;
   a GSM signal reception end coupled to a GSM reception path;
   a band stop filter deployed in the GSM transmission path to filter out an LTE frequency band in a signal to be transmitted in the GSM signal transmission end;
   a GSM reception filter coupled to the GSM reception path to filter out all frequency bands other than a GSM frequency band in a received signal on the GSM signal reception end; and a GSM power amplifier and a GSM path switch coupled to the GSM transmission end, wherein the band stop filter is provided between the GSM power amplifier and the GSM path switch, wherein the band stop filter is composed of a piezoelectric crystal oscillator material, wherein the band stop filter is made of piezoelectric ceramic, lithium niobate, and quartz laminated.

8. A mobile terminal, comprising:

a Global System for Mobile Communications (GSM) signal transmission end coupled to a GSM transmission path for transmitting GSM signals;

a GSM signal reception end coupled to a GSM reception path for receiving GSM signals;

a band stop filter coupled to the GSM signal transmission end;

a processor, adapted to execute instructions; and a memory, adapted to store instructions, wherein the processor loads the instructions from the memory to perform the following steps:

employing the band stop filter to filter out an Long Term Evolution (LTE) frequency band in a signal to be transmitted in the GSM signal transmission end while keeping a GSM transmission loss under 1 dB; and filtering out all frequency bands other than a GSM frequency band in a received signal on the GSM signal reception end, wherein the mobile terminal further comprises:

a GSM reception filter coupled to the GSM reception path, filtering out all frequency bands other than a GSM frequency band in a received signal on the GSM signal reception end; and a GSM power amplifier and a GSM path switch coupled to the GSM transmission end, wherein the band stop filter is provided between the GSM power amplifier and the GSM path switch, wherein the band stop filter is composed of a piezoelectric crystal oscillator material, wherein the band stop filter is made of piezoelectric ceramic, lithium niobate, and quartz laminated.

9. The mobile terminal according to claim 8, wherein the band stop filter passes a frequency band of 1710-1785 Mhz and blocks a frequency band of 1880-1920 Mhz.

10. The mobile terminal according to claim 8, wherein the band stop filter attenuates the frequency band of 1880-1920 MHz by 20 dB or greater than 20 dB.

11. The mobile terminal according to claim 8, further comprising:

an LTE path for transmission/reception of LTE signals; and an LTE filter deployed on the LTE path, filtering out all frequency bands other than the LTE frequency band in signals received/transmitted in the LTE path.

* * * * *